US007913781B2

(12) United States Patent
Hammonds (10) Patent No.: US 7,913,781 B2
(45) Date of Patent: Mar. 29, 2011

(54) OMNI-DIRECTIONAL VEHICLE WITH FULL CIRCUMFERENTIAL REVOLVABLE HITCH

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 783 days.

(21) Appl. No.: 11/363,979

(22) Filed: Feb. 28, 2006

(65) Prior Publication Data

US 2009/0038862 A1 Feb. 12, 2009

(51) Int. Cl.
*B62D 11/00* (2006.01)
(52) U.S. Cl. ........................................ 180/6.48; 180/6.2
(58) Field of Classification Search .................. 180/6.2, 180/6.48, 21
See application file for complete search history.

(56) References Cited

U.S. PATENT DOCUMENTS

| 1,467,456 | A | * | 9/1923 | Silvius | 472/28 |
|---|---|---|---|---|---|
| 2,222,835 | A | * | 11/1940 | Vincent | 15/49.1 |
| 3,938,608 | A | * | 2/1976 | Folco-Zambelli | 180/21 |
| 4,142,599 | A | * | 3/1979 | Schmitt | 180/21 |
| 5,249,636 | A | * | 10/1993 | Kruse et al. | 180/21 |
| 5,472,057 | A | | 12/1995 | Winfree | |
| 5,734,218 | A | * | 3/1998 | Crockett et al. | 310/232 |
| 6,581,703 | B2 | | 6/2003 | Hammonds | |
| 6,830,114 | B2 | | 12/2004 | Hammonds | |
| 6,860,345 | B2 | | 3/2005 | Hammonds | |
| 7,258,181 | B2 | * | 8/2007 | Hammonds | 180/6.48 |
| 7,694,758 | B1 | * | 4/2010 | Hammonds | 180/6.64 |
| 2005/0173163 | A1 | * | 8/2005 | Hammonds | 180/6.5 |
| 2006/0037787 | A1 | | 2/2006 | Hammonds | |
| 2008/0089766 | A1 | * | 4/2008 | Hammonds | 414/429 |
| 2009/0084635 | A1 | * | 4/2009 | Hammonds | 187/401 |
| 2009/0205908 | A1 | * | 8/2009 | Hammonds | 187/222 |

FOREIGN PATENT DOCUMENTS

JP 62-283072 12/1987

OTHER PUBLICATIONS

Lee W. Young, International Search Report—PCT/US2007/05231, Mar. 5, 2008, 2 pages, United States Patent and Trademark Office as International Search Authority, Alexandria, Virginia, USA.
Lee W. Young, International Preliminary Report on Patentability—PCT/US2007/05231, Mar. 5, 2008, 6 pages, United States Patent and Trademark Office as International Search Authority, Alexandria, Virginia, USA.

* cited by examiner

*Primary Examiner* — Joanne Silbermann
*Assistant Examiner* — Daniel Yeagley
(74) *Attorney, Agent, or Firm* — James E. Hudson, III; Crain, Caton & James, P.C.

(57) ABSTRACT

An omni-directional vehicle (ODV) with a circular frame revolvably coupled to an appendage ring using a full circumferential coupling assembly. The appendage ring serves as a point of attachment for a push bar, trailer, tool, vehicle chassis, or other device. Two independent drive wheels located on an axis through the center of the frame are mounted at the same distance from a central vertical axis through the frame. Each wheel is powered independently and can rotate at variable speeds in either direction. The ODV is capable of movement in any direction by rotating the axis of the drive wheels to a position which is perpendicular to the desired direction of travel. The ODV can spin about its vertical axis such that the axis of the drive wheels can be oriented at any direction without changing the original footprint of the space that the frame occupies over the ground.

15 Claims, 10 Drawing Sheets

OMNI-DIRECTIONAL VEHICLE WITH FULL CIRCUMFERENTIAL REVOLVABLE HITCH

BACKGROUND OF THE INVENTION

1. Field of the Invention

This invention relates generally to a wheeled vehicle designed to turn about a central vertical axis. In particular, the invention relates to circular powered utility omni-directional vehicles that are revolvably coupled to tow bars, material handling tools, vehicle chassis, or other appendages.

2. Description of the Prior Art

Within many industries, utility vehicles are often routed through crowded and busy terminals, warehouses, yards, or lots. Space is often at a premium, resulting in limited maneuvering space. Conventional vehicles are typically long, configured with two axles, one in front, the other in the rear. The rear axle is fixed to the frame of the vehicle and provides motive force via a pair of dual wheels. The front axle provides for vehicle steering via two steerable wheels which simultaneously pivot with a limited angular range.

Because there is a fixed distance between the fixed rear drive axle and the front steerable axle, a turning radius exists that far exceeds the space actually occupied by the vehicle itself. The longer the distance between front and rear axles, the larger the turning radius that is required to change directions of the vehicle. A large turning radius makes maneuvering around tight areas difficult and often dangerous. In an area where movement is constrained, a vehicle with a small turn radius is advantageous. Any increase in maneuvering efficiency and safety generally amounts to significant cost savings. It is desirable, therefore, to have a vehicle with greater maneuverability to enhance the safety of the operator, passengers, the surrounding environment, and nearby pedestrians.

Figure 1:
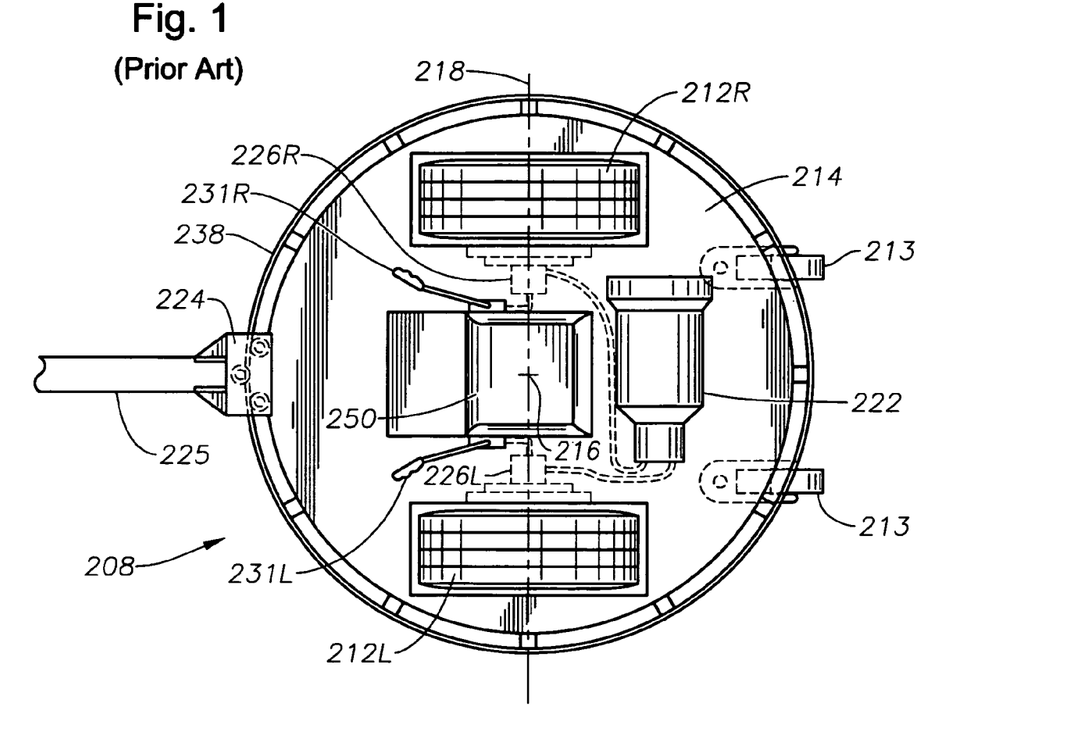
FIG. 1 is a plan view of an omni-directional vehicle of prior art with a circular race and movable trolley hitch assembly with tow bar mounted thereon.
Figure 2:
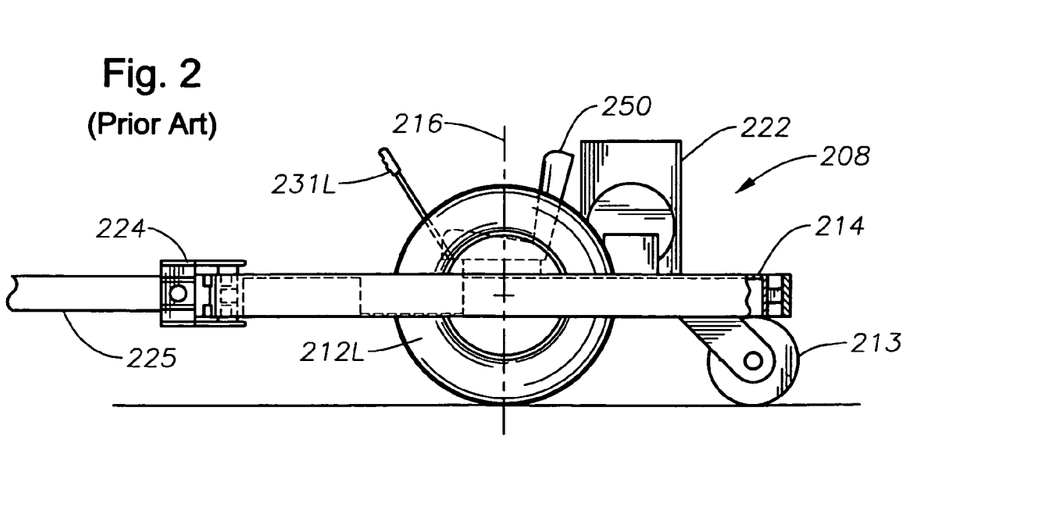
FIG. 2 is a side view of the omni-directional vehicle with tow bar of FIG. 1.

Vehicles that have increased maneuverability are known in the art. For example, a circular omni-directional vehicle (ODV) is disclosed U.S. Pat. No. 6,581,703, issued to Hammonds (Jun. 24, 2003), illustrated herein as FIGS. 1-2. The ODV (208) includes two primary drive wheels (212L, 212R) mounted on a frame (214) which preferably has an outer perimeter in the shape of a circle. The circular frame preferably has a central vertical axis (216) which is perpendicular to the plane of the top view of FIG. 1. The wheels (212L, 212R) are mounted along a horizontal axis (218) which intersects the vertical axis (216) as shown in FIGS. 1-2.

A power source (222) mounted on the frame (214) is provided for driving the vehicle. The power source may be a battery, diesel or gasoline engine with generator, or other suitable source. The power source provides power to separate electric motors (226L, 226R), one for each wheel (212L, 212R). However, the power source may alternatively drive a hydraulic pump (not shown) which powers the individual hydraulic motors to turn the drive wheels. The speed and direction of rotation of the motors (226L, 226R) and wheels (212L, 212R) are controlled by the positioning of control levers (231L, 231R).

The control levers (231L, 231R) and motors (226L, 226R) operate exactly the same for each of the left and right wheels (212L, 212R), respectively. Each lever has a central neutral position, such that when a lever is at the neutral position, a wheel associated with that lever is preferably freewheeled or braked. If a lever (231L, 231R) is moved forward, the corresponding wheel motor (226L, 226R) rotates in a forward direction for turning a respective wheel (212L, 212R). If a lever is moved backward, the corresponding wheel motor rotates in a backward direction for turning a respective wheel. The greater distance that a lever is pushed or pulled from its neutral position, the faster the corresponding wheel motor turns, thereby causing the connected wheel to increase in speed.

If both levers (231L, 231R) are moved in the same direction and amount at the same time, both drive wheels (212L, 212R) move at the same speed, thereby causing straight-ahead movement of the ODV (208) over the ground, perpendicular to the horizontal axis (218). If the levers are pushed forward or backward at an unequal distance from each other, the lever moved the greater distance will produce a greater speed of rotation at its corresponding wheel causing the vehicle to turn toward the wheel that is turning slower. For example, if the right control lever (231R) is pushed farther forward than is the left lever (231L), the ODV (208) turns to the left, and vice versa.

If the right lever (231R) is moved forward and the left lever (231L) is moved backward and both lever positions are the same in amount and opposite in direction, the left wheel (212L) turns backward and the right wheel (212R) turns forward, both at the same rate of rotation. In this instance, the ODV (208) turns in its own space or footprint while its footprint remains stationary over ground, i.e., the ODV revolves about the vertical axis (216). (The ODV footprint is the area of the ground beneath the ODV's circular perimeter.) The counter-clockwise rotation described above becomes a clockwise rotation when the right wheel (212R) rotates backward at the same rate as the forward rotation of the left wheel (212L). Thus, the ODV (208) can change its heading while not moving or varying its footprint over the ground during such a change of heading.

The ODV (208) can move omni-directionally about a given point, change directions with zero maneuvering room beyond the physical footprint of the vehicle, and push or pull attachments with precise control. These capabilities reduce the operating space on the ground required to maneuver, thus increasing operating efficiency. Safety is increased because the operator of the vehicle, positioned in the operator's seat (250) directly at the center of the ODV, can always be facing the direction the vehicle is moving, never having to back up and look backward.

Referring to FIGS. 1 and 2, one or more swivel casters (213) support the ODV (208) and keep it from toppling. A circumferential rail (238) provides a bearing race for supporting a trolley hitch (224). The trolley hitch, which is used to attach a push bar (225), rolls or slides along the circumferential rail, but as the push bar forces are concentrated at the point if the rail where the trolley is located, the rolling or sliding motion may be hindered by the high localized forces and concomitant higher friction forces.

Figure 3:
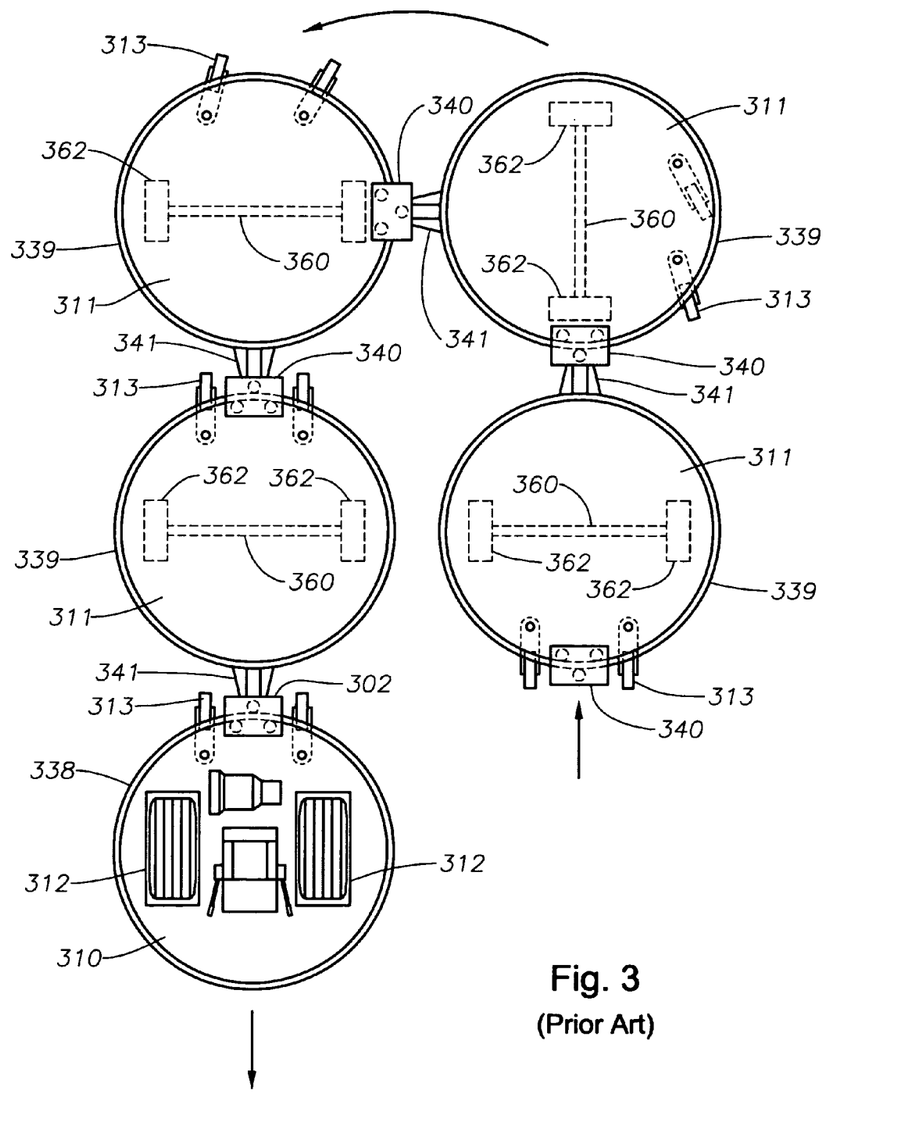
FIG. 3 is a plan view of a prior art omni-directional tractor vehicle with a freely traveling trolley hitch on a circular rail towing a number of trailers each with a similar circular rail and trolley hitch to form a train of linked, highly maneuverable vehicles for carrying luggage around an airport.

As shown in FIG. 3, the Hammonds omni-directional vehicle may also be used to tow a number of trailers. An omni-directional tractor (310) with drive wheels (312) and swivel casters (313) is removably coupled to a train of ODV trailers (311) using a trolley hitch (302) that freely slides along an outer circular rail (338) of the tractor. A hitch tongue (341) is fixed to each ODV trailer (311) perpendicular to and bisecting its trailer axle (360) for coupling to the trolley hitch (340) of the ODV in front of it. Each trailer also includes an outer circular rail (339) and partially revolvable trolley hitch (340) for towing an ODV trailer behind it. Each trailer has an axle (360) with two freewheeling wheels (362) and one or more swivel casters (313) for support.

Figure 4:
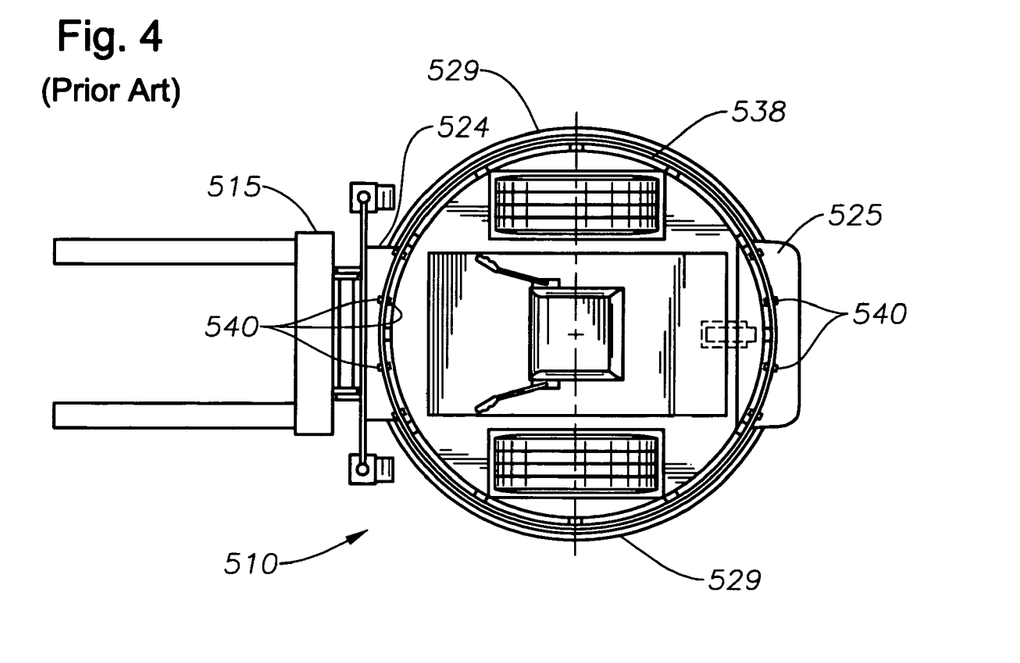
FIG. 4 is a plan view of an omni-directional vehicle of prior art equipped with a revolvable tool trolley, having a material handling tool mounted thereto, and a revolvable counterweight trolley.
Figure 5:
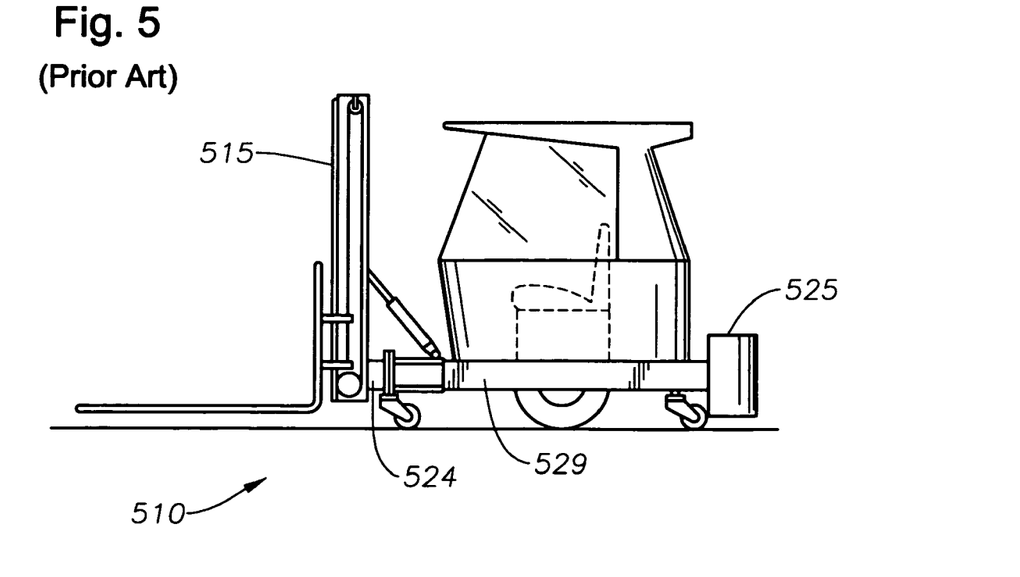
FIG. 5 is a side view of the omni-directional vehicle with material handling tool of FIG. 4.

FIGS. 4 and 5 illustrate a prior art ODV (510) equipped with a forklift tool (515), although other material handling tools are known in the art and may be used. Such ODVs are taught in U.S. Pat. No. 6,830,114, issued to Hammonds on Dec. 14, 2004 and incorporated herein in its entirety by reference. The forklift tool is attached to a tool trolley (524) that engages and freely rides around the ODV on circular rail (538). A plurality of cams or rollers (540) are disposed on the tool trolley to capture the circular rail with substantially no looseness while allowing the tool trolley to freely slide along the rail. A counter weight trolley (525) is positioned 180 degrees from the forklift tool around circular rail (538). The counterweight trolley also includes a plurality of rollers or cams (540) that engage and slidingly coupled the circular rail (538). The relative spacing between the tool trolley (524) and the counterweight trolley (525) is maintained by one or more linkages (529) coupled therebetween. The linkages do not engage the circular rail. Thus, there are high loading forces concentrated at two poles of the circular rail separated by regions of no loading. That is, the rail forces are unbalanced with high localized loading forces existing at the location of the rail occupied by the tool trolley and counterweight trolley. These high localized forces increase the design requirements of the cams or rollers (540) and increase the friction inherent in the trolley system.

The coupling arrangements shown in FIGS. 1-5 all employ trolleys that freely slide or roll along a circumferential race. The trolleys have a curvature to match the curvature of the race, but they only engage a small portion of the circumferential rail at any time. Thus, loads on the circular rail and coupling mechanisms are concentrated at the trolleys, increasing the design requirements of the trolley components and the friction inherent in the trolley systems.

3. Identification of Features Provided by Some Embodiments of the Invention

A primary object of the invention is to provide an omni-directional service vehicle that is designed and arranged for enhanced maneuverability, which includes a full circumferential revolvable coupling arrangement for improved coupling performance.

Another object of the invention is to provide an omni-directional service vehicle equipped with an appendage for towing, pushing, material handling or similar use revolvably coupled to the ODV by a full circumferential coupling arrangement for lowered friction.

Another object of the invention is to provide an omni-directional service vehicle with a revolvable tool or service appendage having relaxed design requirements.

SUMMARY OF THE INVENTION

The objects identified above along with other features and advantages of the invention are preferably incorporated in an omni-directional vehicle revolvably coupled to a tow bar, trailer, tool, vehicle chassis, or other appendage by a full circumferential coupling arrangement. The omni-directional vehicle (ODV) provides unique maneuverability and efficiency due to a combination of its characteristics including its shape and the configuration of its drive wheels. When the ODV is combined with a push bar, trailer hitch and trailer, material handling tool, integral vehicle chassis, or other appendage to its circular frame, the combination provides for increased utility and safety of operation.

In one embodiment, the ODV includes a generally circular frame with a plurality of rollers attached thereto and circumintervaled along its perimeter. An appendage ring has an inner diameter defined by a bearing race with smooth inner, upper, and lower surfaces. The appendage ring is disposed about the ODV frame so that the bearing race is engaged by the rollers to capture and support the appendage ring both horizontally and vertically. The appendage ring can rotate 360 degrees about the ODV, and it distributes its load evenly about the ODV frame perimeter for smooth rotation under load. The serves ad as a point of attachment for a push bar, a trailer hitch assembly, a material handling tool, an integral vehicle chassis, or other useful device.

BRIEF DESCRIPTION OF THE DRAWINGS

The invention is described below with reference to preferred embodiments which are illustrated by the attached drawings, of which.

DESCRIPTION OF THE PREFERRED EMBODIMENTS OF THE INVENTION

Figure 6:
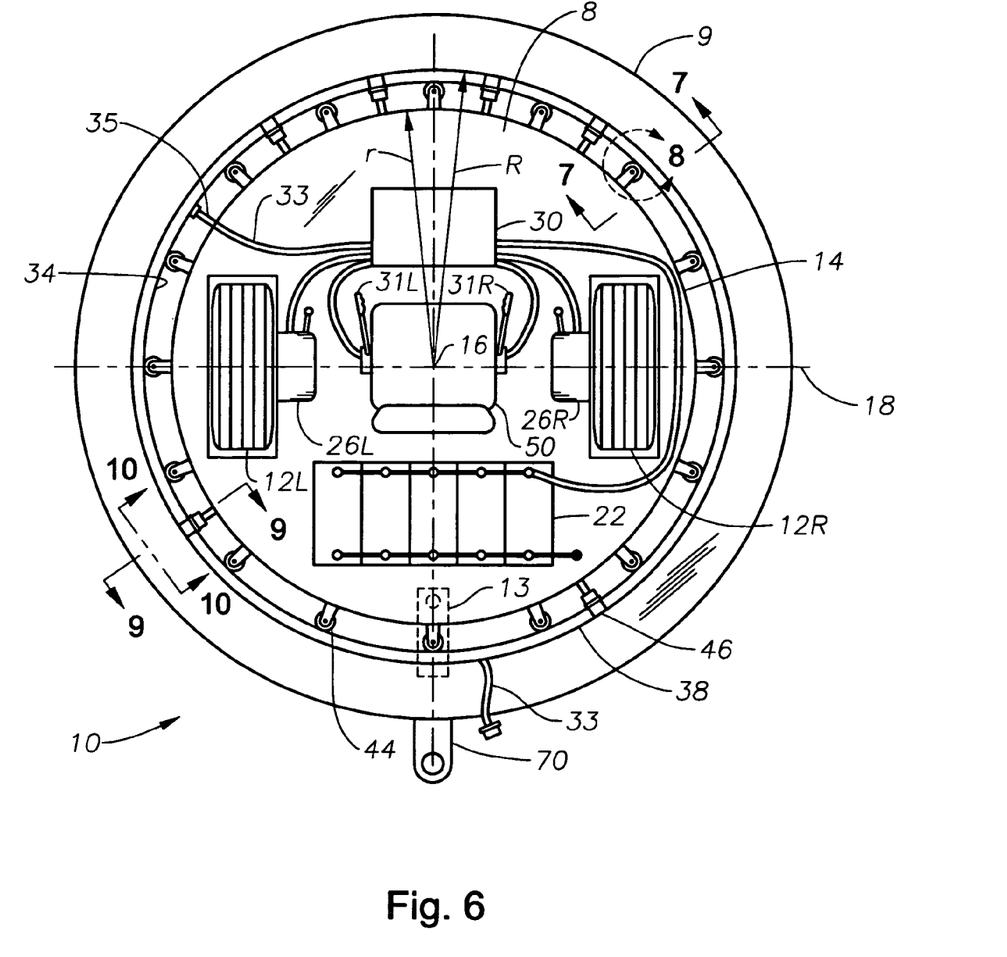
FIG. 6 is a plan view of an ODV with an appendage ring and a trailer hitch revolvably coupled thereto according to one embodiment of the invention, showing the major components—an ODV with circular frame, and appendage ring, and a full circumferential coupling assembly comprising a circular bearing race and rollers for revolvably connecting the appendage ring to the ODV.

Omni-directional vehicles are known in prior art from U.S. Pat. No. 6,581,703, issued to Hammonds (Jun. 24, 2003), and U.S. Pat. No. 6,830,114, issued to Hammonds (Dec. 14, 2004), which are incorporated herein in their entirety by reference. As shown in FIG. 6, the vehicle 10 according to one embodiment of the invention includes an omni-directional vehicle (ODV) 8 revolvably attached to a appendage ring 9. A trailer hitch 70 is shown attached to the appendage ring 9, but other devices may be used as appropriate. ODV 8 preferably includes a circular frame 14, a power source 22 mounted to the frame 14, and first and second drive wheels 12L, 12R rotatively coupled to the frame 14. One or more swivel casters 13 are coupled to the underside of frame 14 to support the vehicle 10 on the ground and prevent it from toppling. The drive wheels 12L, 12R are disposed along and rotate about a horizontal axis 18. When drive wheels 12L, 12R are rotated in opposite directions at the same speed, they revolve 360 around a vertical axis 16. Drive wheels 12L, 12R are independently driven by first and second motors 26L, 26R, which are powered by power source 22. Power source 22 may be a battery or an internal combustion engine, for example, and motors 26L, 26R may be electric or hydraulic motors. First and second control levers 31L, 31R are operatively coupled to and control the speed and direction of the first and second drive wheels 12L, 12R, respectively. An operator seat 50 is coupled to frame 14 near the center of the ODV 8.

Appendage ring 9 surrounds ODV circular frame 14. The inner diameter of appendage ring 9 is defined by a bearing race 38. The bearing race may be integral to appendage ring 9 or may be a separate member that is rigidly attached to the inside of appendage ring 9. The bearing race 38 provides smooth surfaces for receiving and revolvably coupling ODV 8, which preferably has a plurality of vertical and horizontal rollers 44, 46, 47 (FIGS. 7-10) that engage and rotatably capture bearing race 38 in both vertical and horizontal directions with substantially no looseness. The mounting positions of the rollers generally match the curvature of the bearing race 38, thus allowing the bearing race 38 (and attached appendage ring 9) to rotate smoothly with minimal friction and resistance about the ODV 8. Preferably, the rollers are evenly circumintervaled about the perimeter of the ODV 8, but the number, size, and placement of the rollers may vary depending on the design loads. The revolvable coupling assembly, including rollers 44, 46, 47 and bearing race 38, should preferably be completely circumferential to help evenly distribute loads and minimize point-loading-induced stresses, friction, and coupling failures. The rollers may be equipped with ball bearings to provide smooth rotation under load. Alternatively, other full circumferential coupling arrangements may be used to revolvably couple appendage ring 9 to ODV 8. For instance, a bearing race may be rigidly attached to the ODV frame and the engaging rollers may be intervaled within and attached to the appendage ring.

FIGS. 7-10 illustrate the ODV/appendage ring interface details according to one embodiment. Referring to FIGS. 6-10, the bearing race 38 is integral with or mounted to the appendage ring 9 by a suitable means, such as by bolting or welding. ODV 8 has a plurality of vertically-oriented rollers 44 disposed between the inner surface 36 of bearing race 38 and the circular perimeter of ODV frame 14. Vertically-oriented rollers 44 engage the inner surface 36 of the bearing race 38 to horizontally couple ODV 8 to appendage ring 9. ODV 8 also has a plurality of horizontally-oriented rollers 46 located to engage the top surface 39 of the bearing race 38, and a plurality of horizontally-oriented rollers 47 located to engage the bottom surface 37 of the bearing race 38. The horizontally-oriented rollers 47 ride along the bottom surface 37 of the bearing race to vertically support appendage ring 9 on ODV 8, and the horizontally-oriented rollers 46 ride along the top surface 39 of the bearing race 38 to prevent the lower surface 37 of the bearing race 38 from becoming disengaged from the lower horizontal rollers 47. The vertical and horizontal rollers 44, 46, 47 cooperate to horizontally and vertically rotatably capture bearing race 38 with substantially no looseness for revolvably coupling appendage ring 9 to ODV 8. In other words, the ODV 8 is arranged and designed to freely and smoothly rotate within appendage ring 9.

Figure 7:
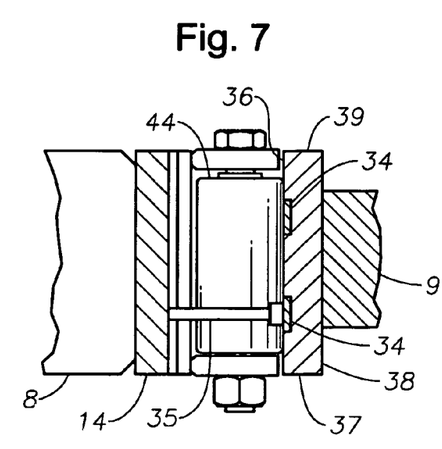
FIG. 7 is an enlarged side view cross section taken along lines 7-7 of FIG. 6 illustrating details of vertically-oriented coupling rollers and the circumferential bearing race of the appendage ring of FIG. 6.
Figure 8:
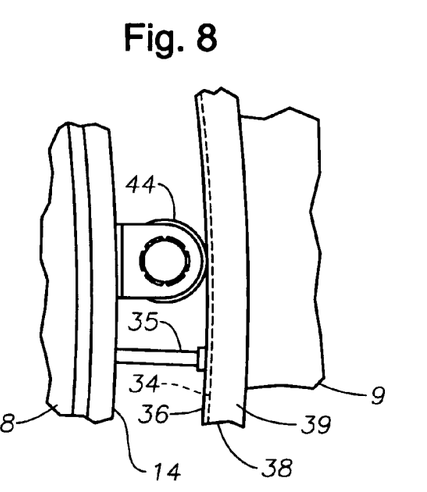
FIG. 8 is an enlarged top view of the vertically-oriented coupling rollers and circumferential bearing race of FIG. 7.
Figure 9:
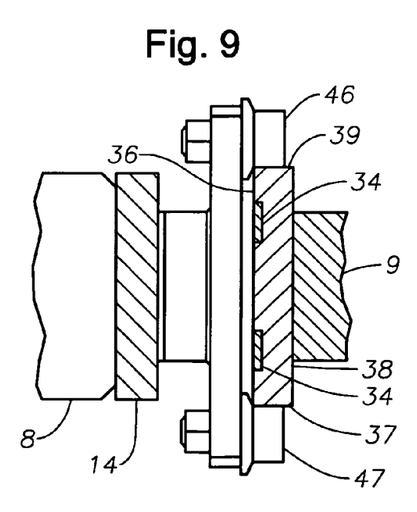
FIG. 9 is an enlarged side view cross section taken along lines 9-9 of FIG. 6 illustrating details of horizontally-oriented coupling rollers and a circumferential bearing race of the appendage ring of FIG. 6.
Figure 10:
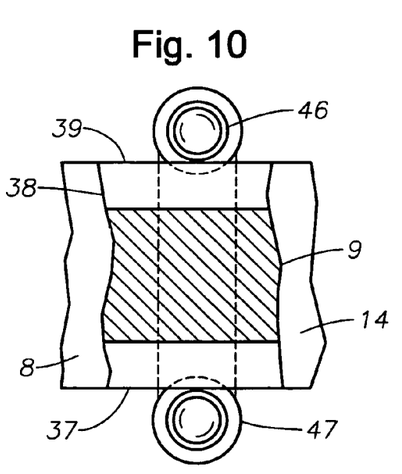
FIG. 10 is an enlarged front view cross section taken along lines 10-10 of FIG. 6 illustrating details of horizontally-oriented coupling rollers and a circumferential bearing race of the appendage ring of FIG. 6.

The appendage ring 9 serves as a point of attachment for a trailer hitch, push bar, material handling tool, integral vehicle chassis, or other useful device. The attached device may require electrical power and control from the ODV 8. For instance, trailer towed by the ODV 8 may require running lights, brake lights and/or turn signals, particularly if the vehicle will be subjected to use in public roadways. Referring to FIGS. 6-8, in one embodiment, electric power and control lines 33 are provided from the ODV 8 to the appendage ring 9 via one or more slip rings 34 mounted on bearing race 38 and carbon brush assemblies 35 mounted to ODV frame 14 that maintain electrical continuity with the slip rings 34 during rotation. Alternatively, electric power and/or control may be provided from the ODV cab 8 to the chassis 9 via long extensible and resilient coiled cables (not illustrated) or via a swivel fitting (not illustrated) located at vertical axis 16. Using cables to bridge the cab/chassis interface provides for a simple design, but limits the number of revolutions the ODV cab 8 can turn in a single direction with respect to the chassis 9 without the need for unwinding by rotating in the opposite direction. As the design and arrangement of power transmission and control across movable boundaries is well known in the art, no further discussion is provided herein.

Figure 11:
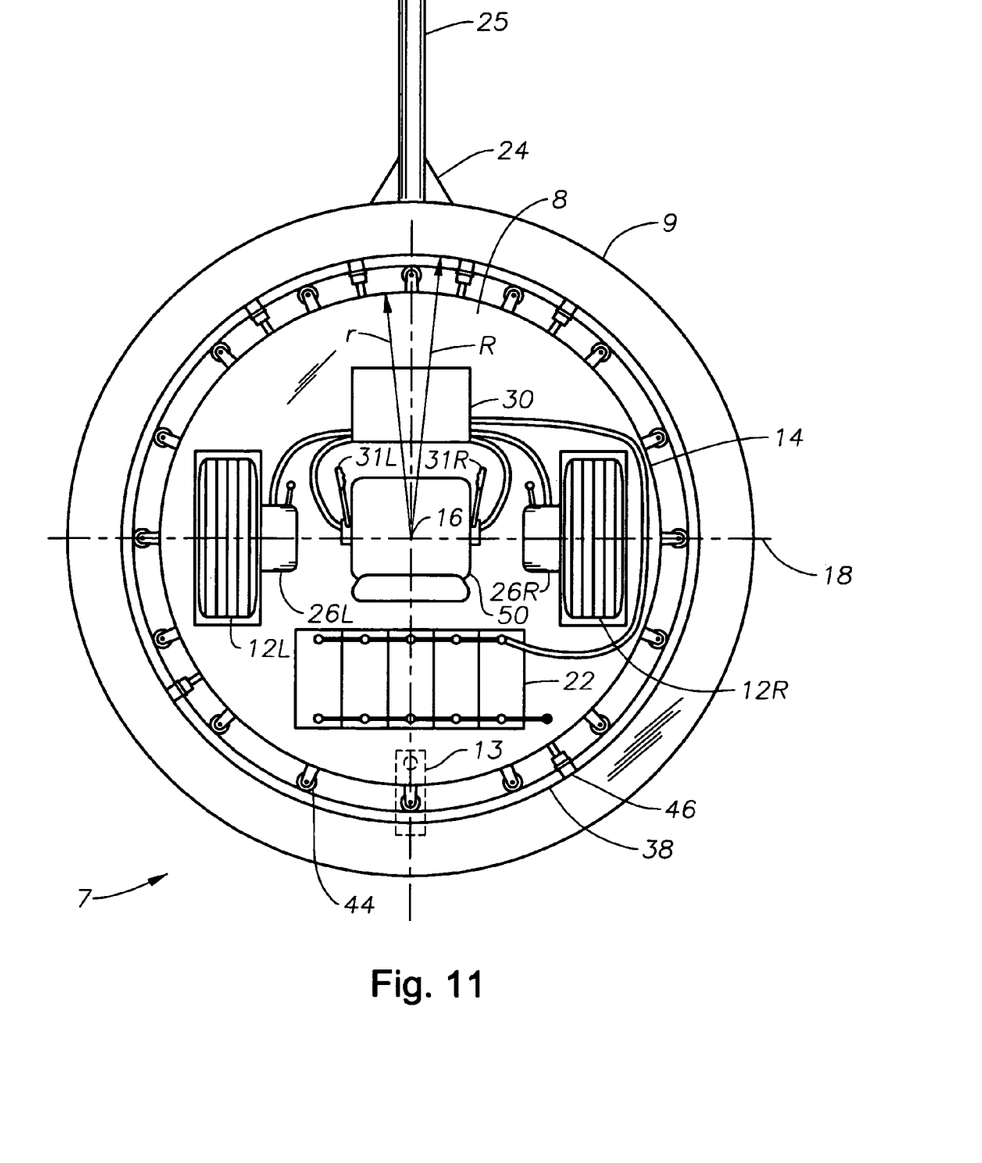
FIG. 11 is a plan view of an ODV with an appendage ring and a push bar assembly revolvably coupled thereto according to one embodiment of the invention, showing the major components—an ODV with circular frame, and appendage ring, and a full circumferential coupling assembly comprising a circular bearing race and rollers for revolvably connecting the appendage ring to the ODV.

FIG. 11 illustrates a vehicle 7 adapted for pushing an aircraft or similar object according to one embodiment of the invention. Vehicle 7 of FIG. 11 is substantially similar to vehicle 10 of FIG. 6 except that instead of having a trailer hitch 70 (FIG. 6) attached to appendage ring 9 at a position generally at the rear of the vehicle for towing trailers in a convention fashion, vehicle 7 of FIG. 11 has a push bar assembly 24, 25 attached to appendage ring 9 at a position generally at the front of the vehicle. The operator is able to steer an airplane during a "push back" operation by slightly turning the ODV to the right or to the left while maintaining ODV 8 in a position firmly behind the push bar assembly 24, 25. As the push bar assembly 24, 25 revolves to a position one side or the other from the front center of the vehicle, the operator simply "turns into the push bar" to regain a position behind the push bar and keep it from passing down the side of the vehicle 7.

Figure 12:
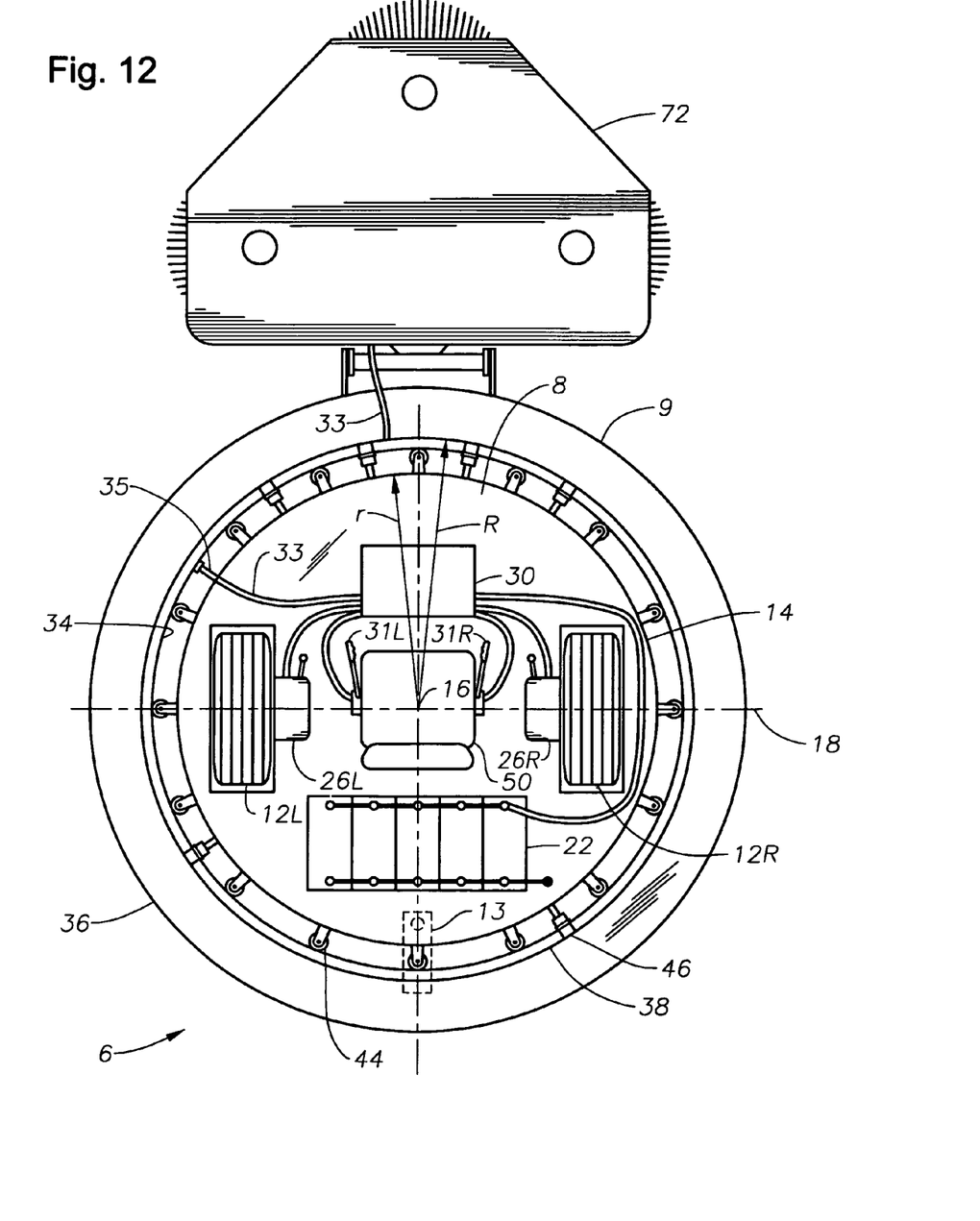
FIG. 12 is a plan view of an ODV with an appendage ring and a material handling tool revolvably coupled thereto according to one embodiment of the invention, showing the major components—an ODV with circular frame, and appendage ring, and a full circumferential coupling assembly comprising a circular bearing race and rollers for revolvably connecting the appendage ring to the ODV.

FIG. 12 illustrates a vehicle 6 adapted with a material handling or similar tool according to one embodiment of the invention. Vehicle 6 of FIG. 12 is substantially similar to vehicle 10 of FIG. 6 except that instead of having a trailer hitch 70 (FIG. 6) attached to appendage ring 9 at a position generally at the rear of the vehicle for towing trailers in a convention fashion, vehicle 6 of FIG. 12 has a broom attachment 72 coupled to appendage ring 9 at a position generally at the front of the vehicle. The operator is able to maneuver the tool 72 by slightly turning the ODV to the right or to the left while maintaining ODV 8 in a position firmly behind the tool. Although a broom attachment 72 is illustrated, fork lift tools, back hoe buckets, plows, or other suitable tools may be used. Power and control may be provided to the tool by cable 33, slip rings 34, and brushes 35 as described above with reference to FIG. 6-10.

Figure 13:
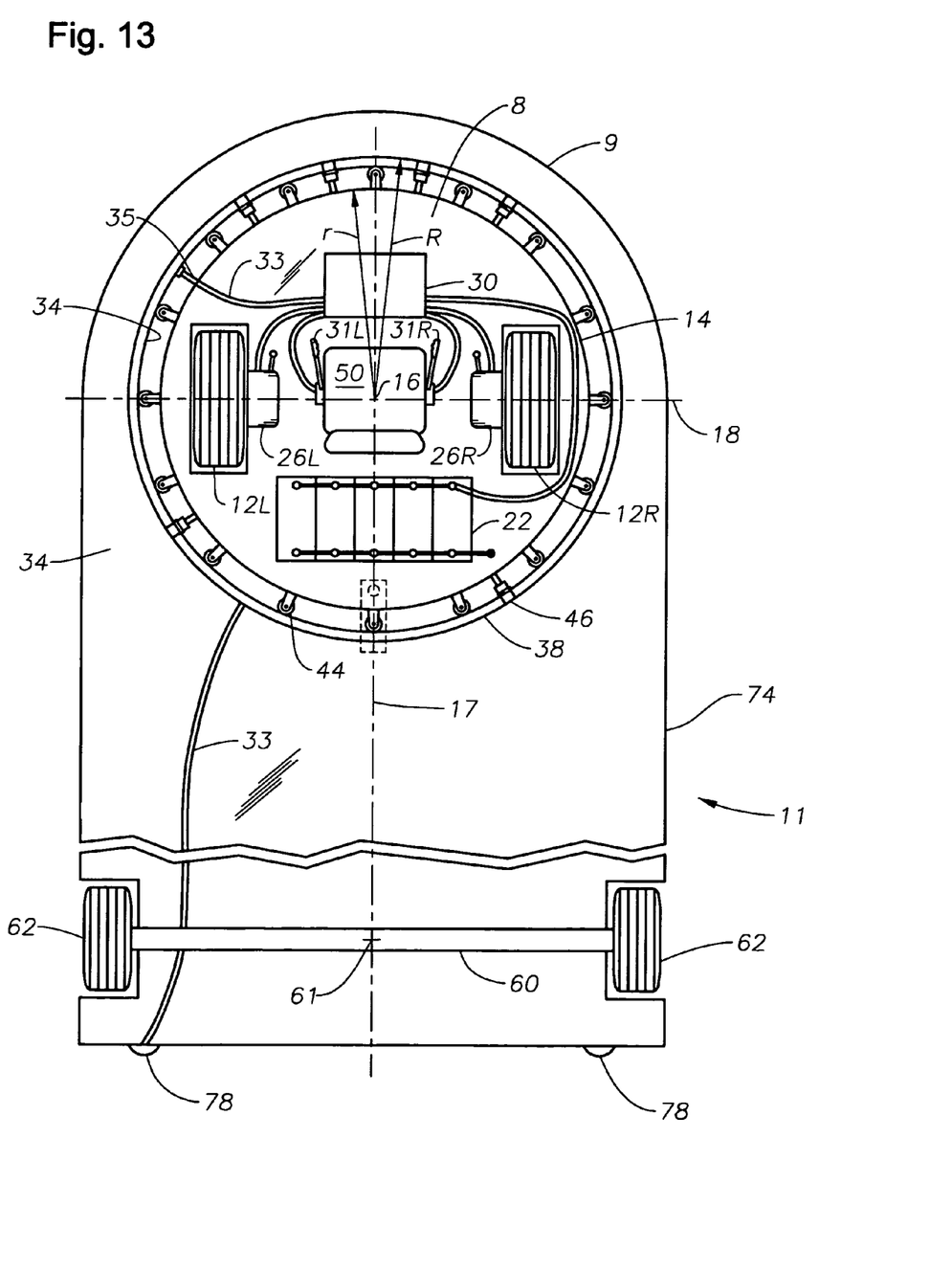
FIG. 13 is a plan view of an ODV with an appendage ring and vehicle chassis integrally and revolvably coupled thereto according to one embodiment of the invention, showing the major components—an ODV with circular frame, and appendage ring, and a full circumferential coupling assembly comprising a circular bearing race and rollers for revolvably connecting the appendage ring to the ODV.

FIG. 13 illustrates a vehicle 11 comprising an ODV 8 revolvably coupled to an integral vehicle chassis 74. Appendage ring 9 is preferably integral with vehicle chassis 74, although it may be a separate member rigidly attached to the vehicle chassis. Vehicle chassis 74 preferably includes a rear axle 60 with one or more wheels 62. Rear wheels 62 are designed and arranged to freewheel, but they may be equipped with brakes for increased safety. Vehicle lights 78 are supplied power from the ODV 8 via cables 33, slip rings 34, and brushes 35, as described above with reference to FIGS. 6-10. When ODV horizontal axis 18 is aligned with the longitudinal center line 17 of the chassis 74, the vehicle 11 has a zero turn radius about the vertical midpoint 61 of the rear axle 60. By pushing both right and left levers 31R, 31L forward, the right lever 31R slightly more forward than the left lever 31L, the vehicle 11 can be made to pivot about the vertical midpoint 61 of the rear axle 60 for repositioning the vehicle 11.

Figure 14:
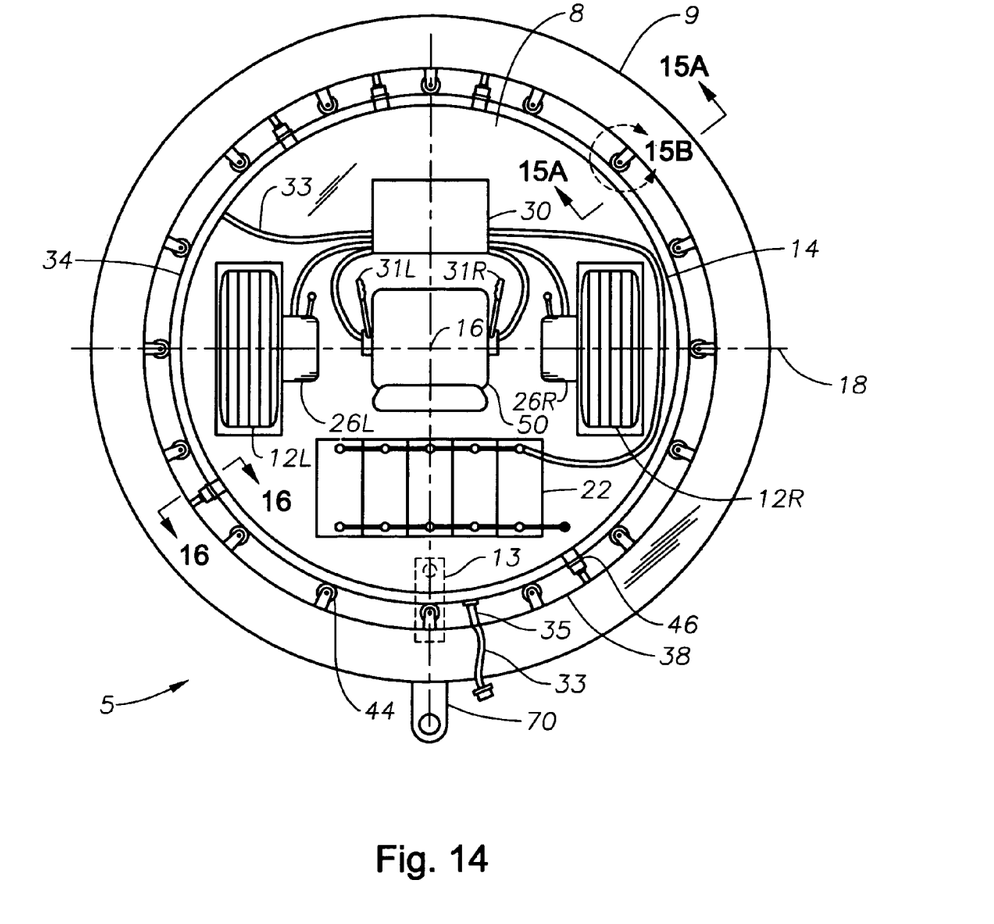
FIG. 14 is a plan view of an ODV with an appendage ring according to another embodiment of the invention, showing the major components—an ODV with circular frame, and appendage ring, and a full circumferential coupling assembly comprising a circular bearing race and rollers for revolvably connecting the appendage ring to the ODV.
Figure 15A:
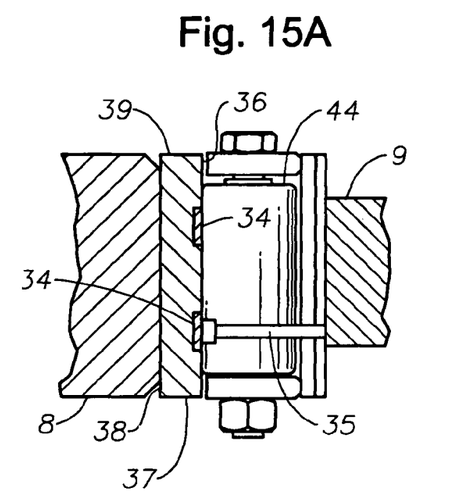
FIG. 15A is an enlarged side view cross section taken along lines 15A-15A of FIG. 14 illustrating details of vertically-oriented coupling rollers and the circumferential bearing race of the ODV of FIG. 14.
Figure 15B:
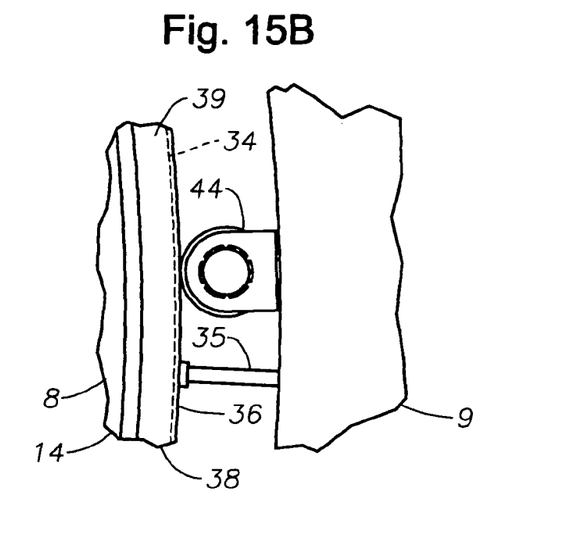
FIG. 15B is an enlarged top view of the vertically-oriented coupling rollers and circumferential bearing race of FIG. 15A.
Figure 16:
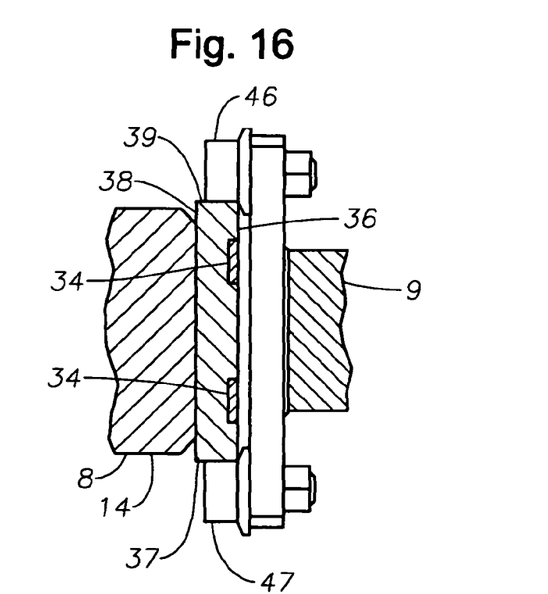
FIG. 16 is an enlarged side view cross section taken along lines 16-16 of FIG. 14 illustrating details of horizontally-oriented coupling rollers and a circumferential bearing race of the ODV of FIG. 14.

FIGS. 14, 15A, 15B and 16 illustrate a vehicle 5 according to a second embodiment of the invention. Vehicle 5 of FIGS. 14-16 is substantially identical to vehicle 10 of FIGS. 6-10, except that the bearing ring 38 is mounted to the outer diameter of the ODV 8, and rollers 44, 46, 47 are mounted to the appendage ring 9. The bearing race 38 may be integral to ODV 8 or may be a separate member that is rigidly attached to the ODV perimeter. Appendage ring 9 has a plurality of vertically-oriented rollers 44 disposed between the outer surface 36 of bearing race 38 and the inner diameter of appendage ring 9 and circuminterspersed about the circumference of the ODV to evenly distribute ring loading. Vertically-oriented rollers 44 engage the outer surface 36 of the bearing race 38 to horizontally couple appendage ring 9 to ODV 8. Appendage ring 9 also has a plurality of horizontally-oriented rollers 46 located to engage the top surface 39 of the bearing race 38, and a plurality of horizontally-oriented rollers 47 located to engage the bottom surface 37 of the bearing race 38. The horizontally-oriented rollers 46 ride along the top surface 39 of the bearing race to vertically support appendage ring 9 on ODV 8, and the horizontally-oriented rollers 47 ride along the bottom surface 37 of the bearing race 38 to prevent the upper rollers 46 from becoming disengaged from the upper bearing race surface 39. The horizontal rollers 46, 47 are also preferably circumintervaled about the circumference of the ODV to evenly distribute ring loading forces. The vertical and horizontal rollers 44, 46, 47 cooperate to horizontally and vertically rotatably capture bearing race 38 with substantially no looseness for revolvably coupling appendage ring 9 to ODV 8.

The Abstract of the Disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. In a service vehicle (10) including an omni-directional vehicle (8) characterized by having first and second independently powered drive wheels (12R, 12L) notably disposed along a horizontal axis (18) and designed and arranged to revolve 360 degrees about a central vertical axis (16) which intersects said horizontal axis between said first and second drive wheels, the improvement comprising:
   a ring (9) encircling said omni-directional vehicle and revolvably coupled thereto by a plurality of engaging elements (44, 46);
   said plurality of engaging elements including a plurality of vertical rollers, said plurality of vertical rollers disposed between said ring and said omni-directional vehicle and generally circuminterspersed about the circumference of said omni-directional vehicle, and a plurality of horizontal rollers; and
   a tool mounted to said ring;
   whereby the generally circuminterspersed position between said omni-directional vehicle and said ring of said plurality of vertical rollers provides a ring loading that is generally evenly distributed about the perimeter of said omni-directional vehicle.

2. The omni-directional vehicle of claim 1 wherein:
   said tool is a hitch.

3. The omni-directional vehicle of claim 1 further comprising:
   a bearing race defining the inner diameter of said ring, said vertical rollers disposed to rotatively engage said bearing race;
   an electrical slip ring mounted to said bearing race, and
   an electrical brush assembly mounted to said omni-directional vehicle designed and arranged to maintain electrical contact with said electrical slip ring during revolution of said ring about said omni-directional vehicle.

4. The omni-directional vehicle of claim 1 further comprising:
   a bearing race defining the outer diameter of said omni-directional vehicle, said vertical rollers disposed to rotatively engage said bearing race;
   an electrical slip ring mounted to said bearing race, and
   an electrical brush assembly mounted to said ring designed and arranged to maintain electrical contact with said electrical slip ring during revolution of said ring about said omni-directional vehicle.

5. The omni-directional vehicle of claim 1 wherein:
   said tool is a push bar.

6. The omni-directional vehicle of claim 1 wherein:
   said tool is a material-handling tool.

7. The omni-directional vehicle of claim 1 wherein said plurality of horizontal rollers include a first plurality of horizontal rollers positioned above said ring and a second plurality of horizontal rollers positioned below said ring.

8. A powered vehicle (10) comprising:

a frame (14) having a generally circular perimeter with a vertical axis (16) defined at the center of said perimeter;

first and second drive wheels (12R, 12L) coupled to said frame, each of said drive wheels capable of independent powered rotation from a horizontal axis (18) disposed through said vertical axis, each of said drive wheels capable of forward and rearward rotation about said horizontal axis;

a control mechanism (31R, 31L) arranged and designed to control the direction of rotation and the speed of said first and second drive wheels;

a ring (9) circumjacent said perimeter of said frame;

a coupling assembly revolvably connecting said ring and said frame, said coupling assembly including a plurality of engaging elements between said ring and said frame;

said plurality of engaging elements including a plurality of vertical rollers, said plurality of vertical rollers disposed between said ring and said omni-directional vehicle and generally circumintervaled about the circumference of said omni-directional vehicle, and a plurality of horizontal rollers; and a tool mounted to said ring;

whereby the generally circumintervaled plurality of vertical rollers provide a ring loading that is generally evenly distributed about the perimeter of the omni-directional vehicle.

9. The powered vehicle (10) of claim 8 further comprising:

a bearing race defining the inner diameter of said ring, said vertical rollers disposed to rotatively engage said bearing race;

an electrical slip ring mounted to said bearing race; and an electrical assembly mounted to said frame designed and arranged to maintain electrical contact with said electrical slip ring revolution of said ring about said frame.

10. The powered vehicle (10) of claim 8 further comprising:

a bearing race defining the inner diameter of said ring, said vertical rollers disposed to rotatively engage said bearing race;

an electrical slip ring mounted to said bearing race, and an electrical brush assembly mounted to said ring designed and arranged to maintain electrical contact with said electrical slip ring during revolution of said ring about said frame.

11. The powered vehicle (10) of claim 8 wherein:
said tool is a hitch.

12. The powered vehicle (10) of claim 8 wherein:
said tool is a push bar.

13. The powered vehicle (10) of claim 8 wherein:
said tool is a material-handling tool.

14. The omni-directional vehicle of claim 13 wherein said plurality of horizontal rollers are rigidly attached to said omni-directional vehicle.

15. The omni-directional vehicle of claim 13 wherein said plurality of horizontal rollers are rigidly attached to ring.

* * * * *